US007558810B2

(12) United States Patent
Rasmussen

(10) Patent No.: US 7,558,810 B2
(45) Date of Patent: Jul. 7, 2009

(54) SYSTEM AND METHOD FOR MANAGING A PATH ENVIRONMENT VARIABLE

(75) Inventor: Eric Rasmussen, Ventura, CA (US)

(73) Assignee: Computer Associates Think, Inc., Islandia, NY (US)

( * ) Notice: Subject to any disclaimer, the term of this patent is extended or adjusted under 35 U.S.C. 154(b) by 451 days.

(21) Appl. No.: 11/134,711

(22) Filed: May 20, 2005

(65) Prior Publication Data

US 2006/0004881 A1 Jan. 5, 2006

Related U.S. Application Data

(60) Provisional application No. 60/573,553, filed on May 21, 2004.

(51) Int. Cl.
  *G06F 17/30* (2006.01)
(52) U.S. Cl. .................................. 707/200; 707/104.1
(58) Field of Classification Search .............. 707/104.1, 707/200, 205
See application file for complete search history.

(56) References Cited

U.S. PATENT DOCUMENTS

| 5,544,316 | A | * | 8/1996 | Carpenter et al. | ............ 719/310 |
| 5,579,469 | A | * | 11/1996 | Pike | ............ 715/781 |
| 6,446,117 | B1 | * | 9/2002 | Gebauer | ............ 709/217 |
| 6,549,952 | B1 | * | 4/2003 | Plassmann et al. | ............ 719/311 |
| 7,013,455 | B1 | * | 3/2006 | Ku et al. | ............ 717/127 |
| 2003/0018963 | A1 | * | 1/2003 | Ashworth et al. | ............ 717/175 |
| 2003/0050936 | A1 | * | 3/2003 | Wainwright | ............ 707/104.1 |
| 2003/0088515 | A1 | * | 5/2003 | Cooper et al. | ............ 705/50 |
| 2003/0107599 | A1 | * | 6/2003 | Fuller et al. | ............ 345/763 |
| 2003/0110242 | A1 | * | 6/2003 | Brown et al. | ............ 709/222 |
| 2003/0187872 | A1 |  | 10/2003 | Gray et al. | ............ 707/103 |
| 2005/0055665 | A1 | * | 3/2005 | Woo et al. | ............ 717/101 |
| 2005/0097082 | A1 | * | 5/2005 | Yan | ............ 707/3 |

OTHER PUBLICATIONS

Ashley J. S. Mills, "*Configuring A Windows Working Environment*", Online! 2002, (XP002352618), The University of Birmingham, Retrieved from internet at http://supportweb.cs.bham.ac.uk/documentation/tutorials/docsystem/build/tutorials/winenvars.html,(2 pages), Nov. 11, 2005.
John L. Furlani, "*Modules: Providing a Flexible User Environment*", Online! 1993, (XP002352620) 12 pages, Nov. 11, 2005.

(Continued)

*Primary Examiner*—Leslie Wong
(74) *Attorney, Agent, or Firm*—Baker Botts L.L.P.

(57) ABSTRACT

A method and/or system for managing path environment variables in a data processing or computer system includes the steps of reading at least one path environment variable string; parsing at least one path variable from the at least one path environment variable string; and determining if a file directory associated with the at least one path variable exists; if the file directory does not exist, deleting the at least one path variable and reassembling the path environment variable string. Furthermore, the method and system will allow a user to rearrange the order of the path variables so operating system program searching could be optimized to allow known heavily used directories to be searched first thereby reducing processing time.

8 Claims, 3 Drawing Sheets

OTHER PUBLICATIONS

"*Spring Cleaning 3.0 User's Guide*", Online! 2003, Aladdin Systems, Inc., (XP002352619), retrieved from internet at: http://support.allume.com/techsupport/manuals/SpringCleaning300WINUG.pdf(102 pages), Nov. 11, 2005.

Wm. R. Stanek, "*Configuring System and User Environment Variables*", Online! 1999, (XP002352617), retrieved from internet at: http://www.microsoft.com/technet/prodtechnol/windows2000serv/maintain/optimize/02w2kadb.mspx (6 pages), Nov. 11, 2005.

Notification of Transmittal of the International Search Report and the Written Opinion of the International Searching Authority for International Application No. PCT/US2005/017603, filed May 20, 2005 (13 pages), Nov. 22, 2005.

\* cited by examiner

SYSTEM AND METHOD FOR MANAGING A PATH ENVIRONMENT VARIABLE

CROSS-REFERENCE TO RELATED APPLICATIONS

This application claims priority to an application entitled "SYSTEM AND METHOD FOR MANAGING A PATH ENVIRONMENT VARIABLE" filed in the United States Patent and Trademark Office on May 21, 2004 and assigned Ser. No. 60/573,553, the contents of which are hereby incorporated by reference.

BACKGROUND

1. Field

The present disclosure relates generally to data processing and desktop maintenance systems, and more particularly, to a system and method for managing a path environment variable in an operating system of a data processing system.

2. Description of the Related Art

The Windows™ operating system PATH is an environment string that contains a long list of file system directory paths. When launching any program in a conventional data processing or computer system, the Windows™ operating system searches all directories in the PATH environment variable string to find the requested program. There is a USER and SYSTEM PATH each of which can be, depending on the Windows™ version, up to 1024 chars in length. When a program search is done, the two PATHs are concatenated and searched as one. Long PATHs will slow down program execution. Additionally, there is the chance of running out of PATH space during installation of a program. This will prevent the program from installing.

Older or poorly written Windows™ application uninstall programs, even after they have removed all of their files, tend to leave behind entries in the Windows™ PATH environment variable string. The directories left behind no longer exist on the file system so they not only slow down program loading but can contribute to the problem of running out of PATH space.

During install program testing, developers and testers install and uninstall programs many times changing the install locations as they test. The install program typically leaves behind many directories, resulting in clogged PATHs. Eventually, the install program would fail due to lack of space in the PATH environment variable string.

Path maintenance is currently done in the Windows™ Environment Variable dialog. The directory strings are concatenated and separated by a semi-colon making it unreadable and difficult to maintain. To illustrate the awkward interface used in Windows™ to maintain program PATH information, FIG. 1 is a screenshot of the Windows XP System Properties dialog 100 further expanded to show the Environment Variable lists 102 for User and System variables and the Edit System Variable dialog 104, which contains the System PATH, edit field. Due to its layout, the PATH string 106 is hard to edit and extremely error prone due to the hand editing required. The user must horizontally scroll through a standard single line edit field 106, where the directories are delimited by semi-colons. Directories are manually removed by deleting character by character until the delimiting semi-colon is found. This can lead to mistakes that can cause programs to no longer function.

Therefore, a need exists for techniques to allow computer users, e.g., testers/developers, to view PATHs in a more user-friendly way and to determine which PATHs actually exist on a file system of a data processing or computer system. Furthermore, techniques are needed to facilitate computer system maintenance and for deleting obsolete directories.

SUMMARY

A method and system for managing environment variables in a data processing or computer system are provided. The methods and systems of the present disclosure provide a software utility and user interface for facilitating file directory maintenance.

In one embodiment, the user interface includes a standard Windows™ operating system dialog containing two list boxes, one for the SYSTEM PATH and one for the USER PATH. A Remove button is placed next to each list. When the software utility is launched, it reads and parses each path variable and loads each list box with a vertical list of file directories associated with each path variable. Each directory is examined on the file system to see if it actually exists. The user interface further includes another column to display Yes or No based on the existence of the directory on the file system. A user may then delete the path variable that has no corresponding directory on the file system.

In a further embodiment of the present disclosure, the method and system will allow the user to rearrange the order of the directory strings in the list so Windows™ program searching could be optimized to allow known heavily used directories to be searched first thereby reducing processing time.

In conventional methods, system directories are shown in their raw format (i.e. %systemroot%). The method and system of the present disclosure will expand these directory designators to their actual values (e.g., %systemroot%=C:\Windows). The System and User PATH listboxes will translate these directory names to the actual names.

Furthermore, directories that contain spaces are often represented by their DOS short path name. For example, C:\Program Files would be shown as C:\PROGRA~. Some install programs install their program paths as DOS short names. The method and system of the present disclosure will expand DOS short names into the corresponding Windows™ long path names when listing the paths making it easier for the user to appreciate the paths directory structure.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION

Preferred embodiments of the present disclosure will be described hereinbelow with reference to the accompanying drawings. In the following description, well-known functions or constructions are not described in detail to avoid obscuring the present disclosure in unnecessary detail. In the following description, PATH (capitalized) is used to distinguish the Windows™ operating system environment variable called PATH, vs. the more general usage of the word path that indicates a file system directory structure (e.g., c:\Program Files\Pathclean).

A method and system for managing environment variables in a data processing or computer system are provided. The methods and systems of the present disclosure provide a software utility and user interface for facilitating file directory maintenance. In the following description, the method and system of the present disclosure will be described in conjunction with the PATH environment variable of Microsoft's™ Windows™ operating system.

Figure 2:
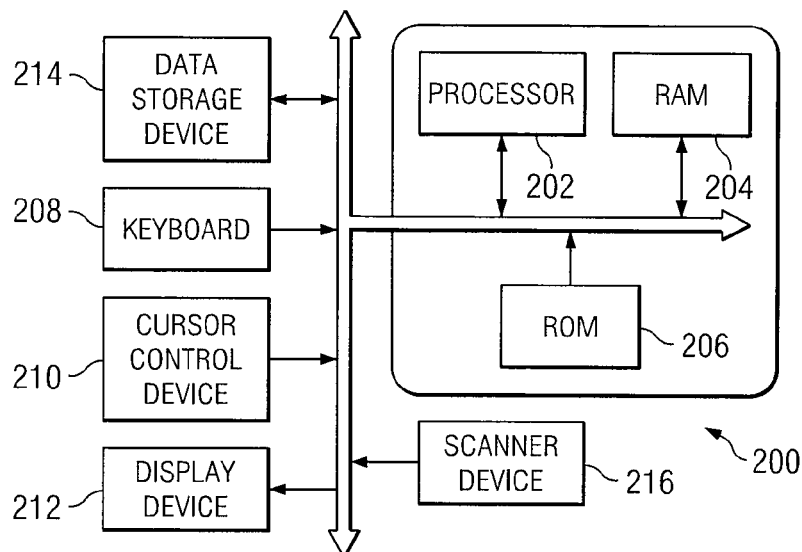
FIG. 2 is a block diagram of an exemplary system for managing a path environment variable in accordance with an embodiment of the present disclosure.

It is to be understood that the present disclosure may be implemented in various forms of hardware, software, firmware, special purpose processors, or a combination thereof. In one embodiment, the present disclosure may be implemented in software as an application program tangibly embodied on a program storage device. The application program may be uploaded to, and executed by, a machine comprising any suitable architecture such as a data processing machine or a personal computer. With reference to FIG. 2, preferably, the machine 200 is implemented on a computer platform having hardware such as one or more central processing units (CPU) 202, a random access memory (RAM) 204, a read only memory (ROM) 206 and input/output (I/O) interface(s) such as a keyboard 208, cursor control device 210 (e.g., a mouse or joystick) and display device 212. The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device, a printing device and a scanning device 216.

It is to be further understood that, because some of the constituent system components and method steps depicted in the accompanying figures may be implemented in software, the actual connections between the system components (or the process steps) may differ depending upon the manner in which the present disclosure is programmed. Given the teachings of the present disclosure provided herein, one of ordinary skill in the related art will be able to contemplate these and similar implementations or configurations of the present disclosure.

Figure 3:
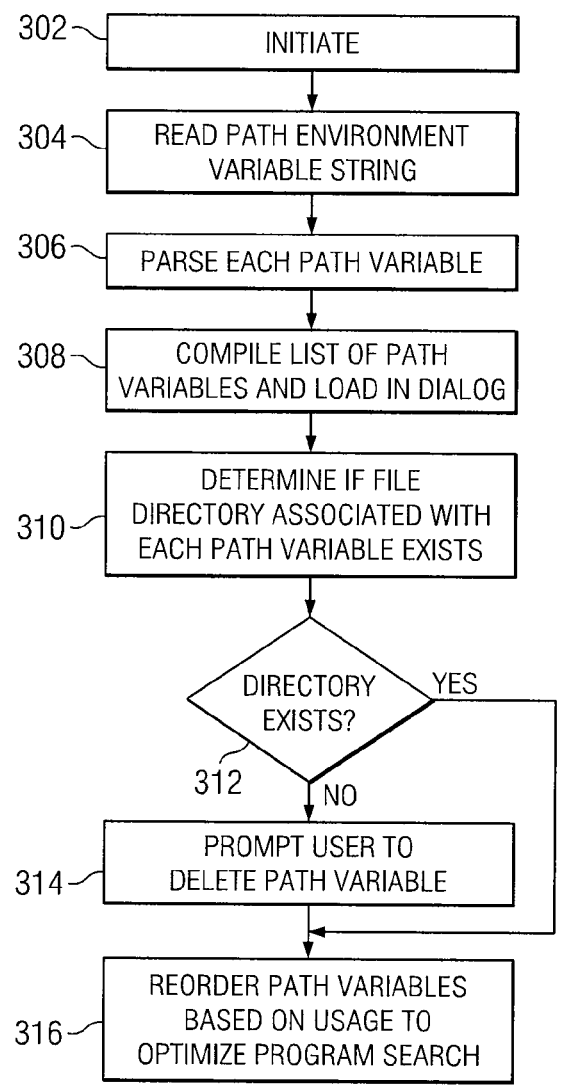
FIG. 3 is a flow chart illustrating a method for managing a path environment variable in accordance with an embodiment of the present disclosure.
Figure 4:
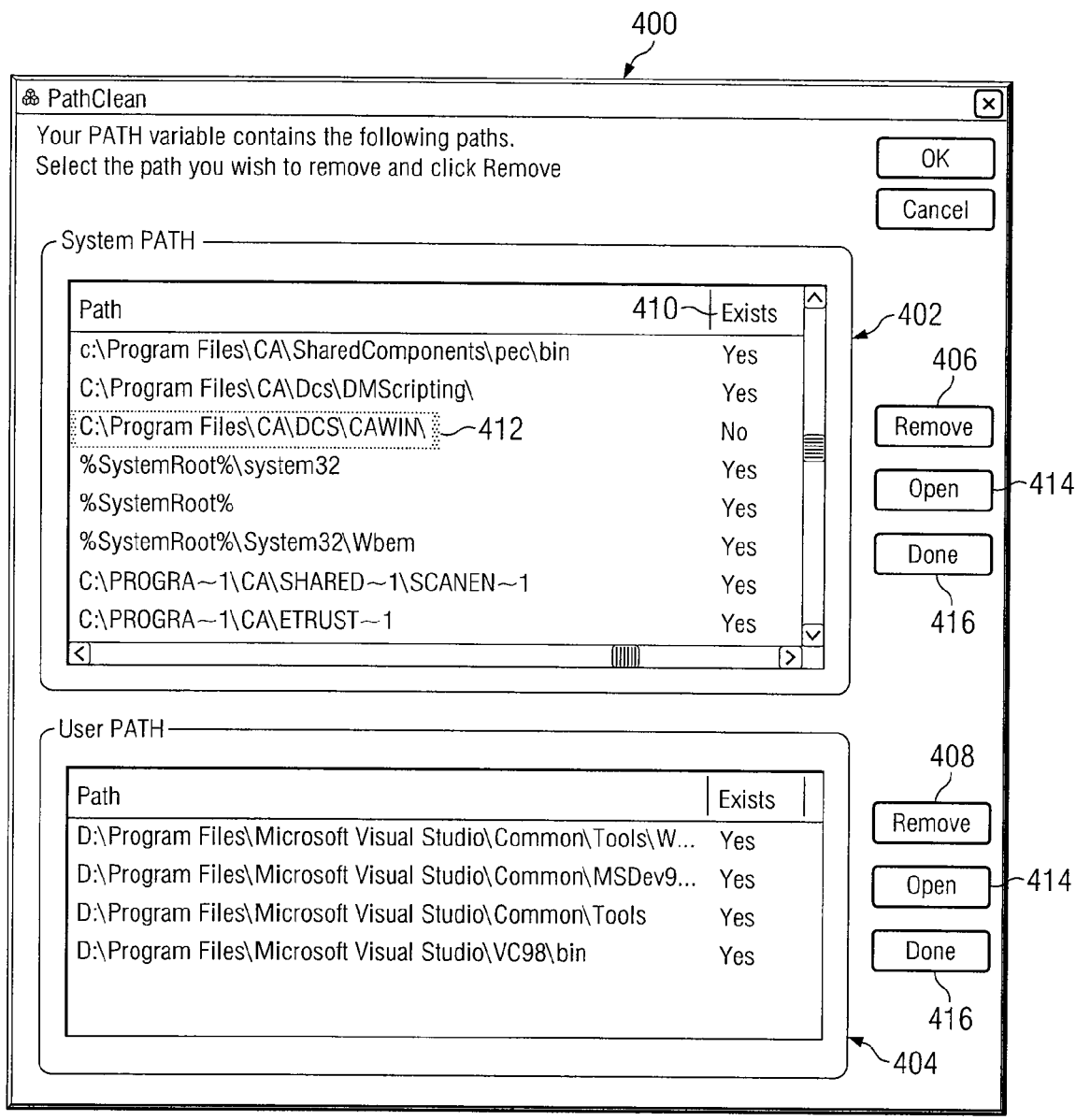
FIG. 4 is an exemplary screen shot of an interface for employing a method for managing a path environment variable in accordance with an embodiment of the present disclosure.

Referring now to FIGS. 3 and 4, a method for managing an environment variable in a computer system will now be described. FIG. 3 is a flow chart illustrating a method for managing a path environment variable in accordance with an embodiment of the present disclosure. FIG. 4 is an exemplary screen shot of an interface for employing a method for managing a path environment variable in accordance with an embodiment of the present disclosure.

Figure 1:
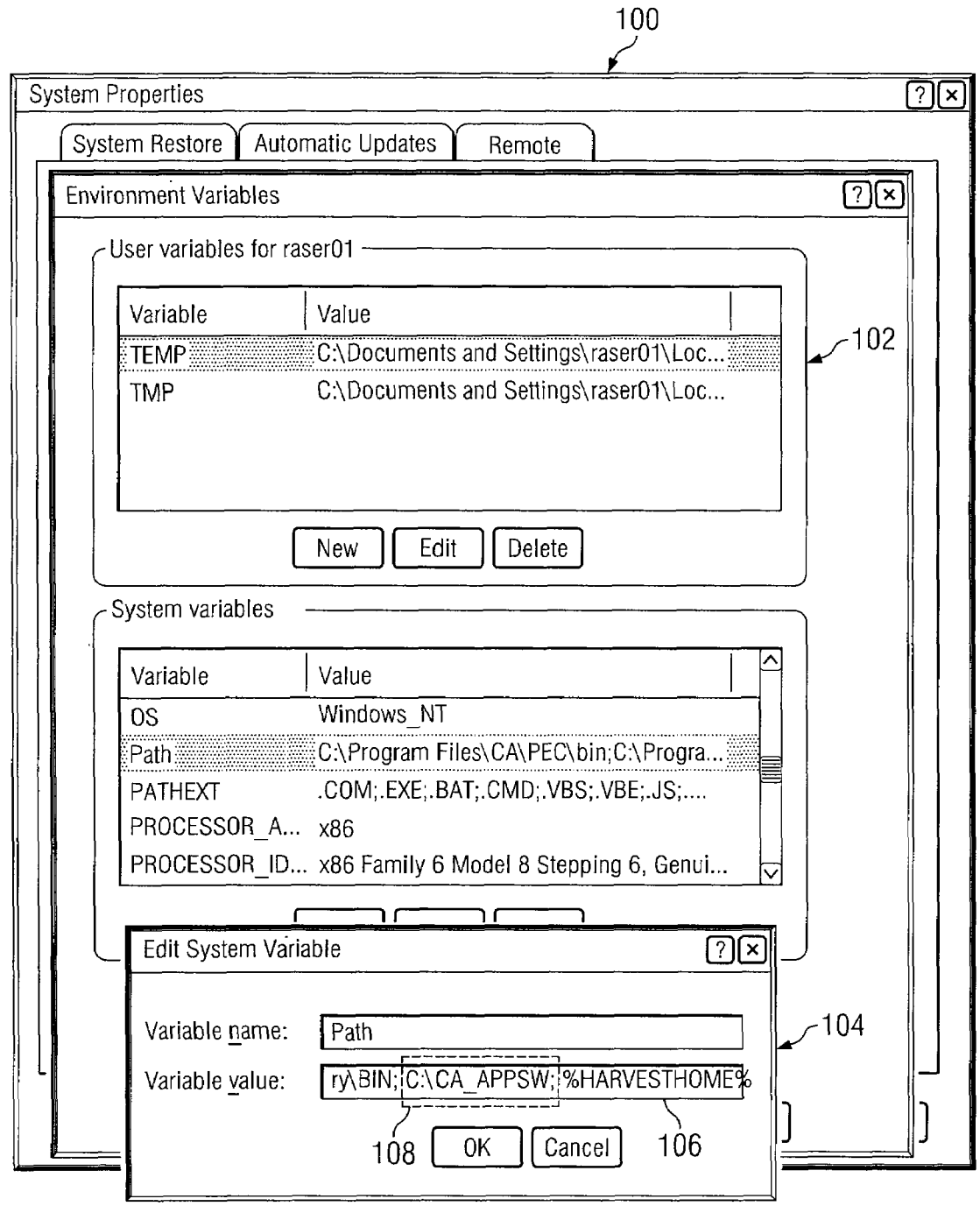
FIG. 1 is a screen shot of a conventional data processing system for managing a path environment variable.

Initially, in step 302, the utility software application for managing the PATH environment variable is launched. The PATH environment variable string is read (step 304) and each path variable, e.g., a file directory, is parsed (step 306). The parsing of the path variables may be accomplished by finding successive delimiting semi-colons in the PATH environment variable string 106 as shown in FIG. 1. For example, the user and system paths are read from the Windows registry using the Windows API function RegOpenKeyEx( ). The system PATH string is read from the registry key LOCAL_MACHINE\System\CurrentControlSet\Control\Session Manager\Environment\PATH and the user PATH string is read from CURRENT_USER\Environment\PATH. An internal function ParsePathIntoListBox( ) iterates through each PATH string looking for semi-colons and separating each individual directory name when a semi-colon is found. As shown in the example of FIG. 1, an exemplary path variable may be C:\CA_APPSW 108.

Once all the path variables are parsed, the path variables are compiled and loaded in a user interface dialog 400 (step 308), as shown in FIG. 4. The user interface 400 includes a standard Windows™ dialog containing two list boxes, one for the SYSTEM PATH 402 and one for the USER PATH 404. A Remove button 406, 408 is placed next to each list 402, 404, function of which will be described below.

Once the lists are compiled, the utility application determines if a file directory associated with each path variable exists (step 310). This may be accomplished by checking the root directory, e.g., C:\, of the file system of the computer to determine if the file directory exists. Alternatively, if a directory does exist but has no files in it, it may be deemed not to exist. For example, the C runtime library function _chdir( ) is used to check for directory existence. It attempts to change the Windows default directory to the directory in question. If _chdir( ) succeeds, the path exists. To check the directory to see if it is empty a Microsoft MFC CFileFind object is created and CfileFind::FindFile("<dir>\\*.*") is called.

If the file directory does not exist (step 312), a NO will be placed in a EXISTS column 410 of the user interface 400. Otherwise, if the file directory does exists, a YES will be placed in the EXISTS column 410.

If the directory does not exist as indicated by a NO in the EXISTS column 410, the user may easily be prompted to delete the corresponding path variable from the PATH environment variable string (step 314). As illustrated in FIG. 4, the SYSTEM PATH variable C:\Program Files\CA\DCS\CAWIN\ 412 does not exist. The user may simply highlight the non-existent directory and click the Remove button 406 to delete the path variable. This action will subsequently remove the path variable from the PATH environment variable string 106 and the PATH environment variable string will be reassembled without the path variable. By removing path variables corresponding to non-existent directories, a computer system employing the method of the present disclosure will launch applications faster since it will not waste time search for directories no longer present on the computer's hard drive.

It is to be appreciated that the deletion of path variables associated with non-existent file directories may be performed automatically by the utility application without user intervention. The automatic deletion of path variables may be useful in performing periodic scheduled maintenance of the operating system.

Once the user has deleted all non-existent directories, the user may reorder the remaining path variables of the directory strings in the PATH variable lists 402, 404 so Windows™ program searching could be optimized to allow known is heavily used directories to be searched first thereby reducing processing time (step 316). To reorder the path variables, the user will highlight a desired path variable and move it to a desired position by utilizing the UP button 414 or DOWN button 416 in the user-interface 400. Once the preferred order is set, the utility program will reassemble the PATH environment variable string using the parsed path variables, delimiting each with a semi-colon. For example, a C++ for( ) loop is used to concatenate each directory from the Pathclean listbox into a Cstring object. The Cstring += (append operator) is used. The resulting Cstring object is then written back to the registry using RegSetValueExt( ).

A method and system for managing environment variable in a computer system has been described. The method and system in accordance with the principles of the present disclosure will be beneficial for maintaining test/development machines where software is installed and uninstalled continually. Furthermore, the method and system of the present disclosure may be utilized for general periodic cleanup for all Windows™ desktop machines.

While the disclosure has been shown and described with reference to certain preferred embodiments thereof, it will be understood by those skilled in the art that various changes in form and detail may be made therein without departing from the spirit and scope of the disclosure as defined by the appended claims.

What is claimed is:

1. A method for managing a path environment variable in a data processing system, the method comprising the steps of:
    reading at least one path environment variable string;
    parsing at least one path variable from the at least one path environment variable string; and
    determining if a file directory associated with the at least one path variable exists after parsing the at least one path variable;
    compiling a list of parsed path variables;
    presenting the list of parsed path variables to a user on a display;
    indicating, in the list, which parsed path variables are associated with a non-existent file directory and which parsed path variables are associated with an existing file directory;
    presenting a prompt to the user requesting deletion of a path variable associated with a non-existent file directory;
    presenting a prompt to the user requesting reordering of the list of parsed path variables on the display; and
    reassembling the path environment variable string with the reordered list of parsed path variables.

2. The method according to claim 1, further comprising the step of, if the file directory does not exist, deleting the at least one path variable.

3. The method according to claim 2, further comprising the step of reassembling the path environment variable string.

4. The method according to claim 1, wherein the at least one path environment variable string is a system path or a user path.

5. A program storage device readable by a computer, tangibly embodying a program of instructions executable by the computer to perform method steps for managing a path environment variable, the method steps comprising:
    reading at least one path environment variable string;
    parsing at least one path variable from the at least one path environment variable string; and
    determining if a file directory associated with the at least one path variable exists after parsing the at least one path variable;
    compiling a list of parsed path variables;
    presenting the list of parsed path variables to a user;
    indicating, in the list, which parsed path variables are associated with a non-existent file directory and which parsed path variables are associated with an existing file directory;
    presenting a prompt to the user requesting deletion of a path variable associated with a non-existent file directory;
    presenting a prompt to the user requesting reordering of the list of parsed path variables; and
    reassembling the path environment variable string with the reordered list of parsed path variables.

6. The program storage device according to claim 5, further comprising the step of, if the file directory does not exist, deleting the at least one path variable.

7. The program storage device according to claim 6, further comprising the step of reassembling the path environment variable string.

8. The program storage device according to claim 5, wherein the at least one path environment variable string is a system path or a user path.

* * * * *